Sept. 7, 1948.  R. HOLZCKER  2,448,802
METHOD FOR CONCENTRATING AQUEOUS
SUSPENSIONS AND SOLUTIONS
Filed Dec. 29, 1944

Inventor
Richard Holzcker
By Mason Fenwick & Lawrence
Attorneys

Patented Sept. 7, 1948

2,448,802

UNITED STATES PATENT OFFICE 2,448,802

METHOD FOR CONCENTRATING AQUEOUS SUSPENSIONS AND SOLUTIONS

Richard Holzcker, Lake Wales, Fla., assignor to Florida Frozen Fruits, Inc., a corporation of Florida Application December 29, 1944, Serial No. 570,428

5 Claims. (Cl. 62—124).

This invention relates to a method of concentrating aqueous solutions, mixtures, suspensions, or emulsions, and particularly to concentrating natural juices, extracts, milk, and similar substances, to produce a concentrate which upon reconstitution to volume by the addition of water, possesses the original dietary value and a natural aroma and taste.

Heretofore, it has been customary to heat such solutions or mixtures to their boiling point, in order to evaporate the desired portion of the water. In order to protect heat sensitive substances, the boiling point of the solution has often been lowered by evaporating under reduced pressure. However, in practically every instance the concentrate obtained has provided a different taste from that of the original material.

It has, therefore, been proposed in order to improve the product, to remove the water in the form of ice, instead of as a vapor, by applying refrigeration to the solution at a rate which will permit the formation of practically pure ice crystals. This is of necessity a slow process because sufficient time must be allowed for the formation of the ice crystals without the entrapping of any dissolved or suspended solids, in the crystalline structure.

I have now found that aqueous solutions may be concentrated by solidifying at least a portion of their water by freezing, by subjecting the solution, or suspension, to a sufficiently high vacuum to cause a portion of the water to evaporate, but without the application of external heat, and thus cool the entire mass to the point of ice formation, the ice being then mechanically separated from the concentrated mother liquor.

This method has distinct advantages. It permits the processing to take place in simple equipment. The cooling effect is not limited to the size of any contact area, but takes place from within the solution, and therefore, with slight agitation permeates throughout the charge. The material to be processed is for all practical purposes out of contact with the atmosphere, and thus can not oxidize. Simple variation of the rate of evacuation will permit control of the rate of cooling, and in that manner, influence the rate of ice formation and crystal growth. Furthermore, as it is desired to remove a portion of the water, and the cooling effect is accomplished by partial evaporation, the application of vacuum freezing has the dual effect in a single process step, of removing a portion of the water as vapor and freezing out a portion of the remainder.

Those skilled in the art will realize that this method of concentrating aqueous solutions may be applied to continuous as well as batch processing.

The method is illustrated in the accompanying drawing, in which

By way of example, natural citrus juice has been selected in describing the method.

Figure 1:
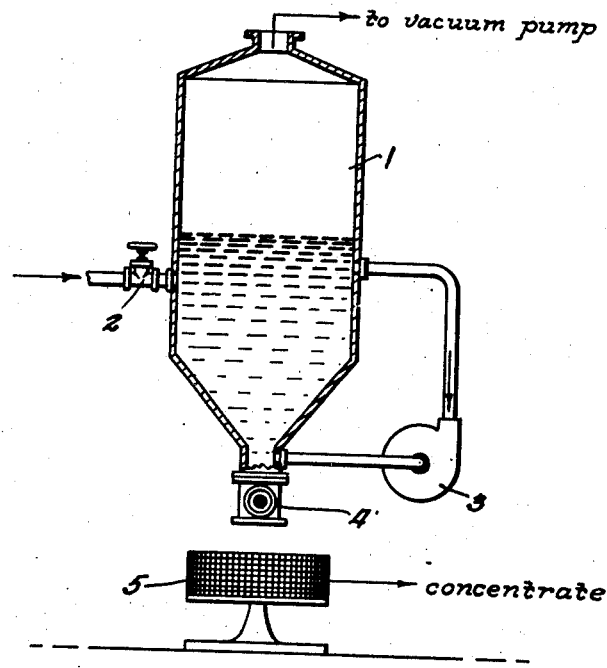
Figure 1 is a diagrammatic view of apparatus for the batch treatment of the aqueous solution or suspension according to the subject method.

Referring now in detail to Figure 1, freshly expressed citrus juice is fed into the lower part of the vacuum vessel 1, through the valve controlled inlet 2, which is then closed. The juice may be at room temperature, although to avoid the risk of deterioration preceding processing, it is generally desirable to precool the juice. The initial temperature is not critical to the method. The higher the temperature, the longer it takes to reduce the temperature to the point of ice formation, but this is compensated by the removal of a greater quantity of water through evaporation.

The upper part of the vacuum vessel is in communication with a vacuum pump, by means of which sufficiently high vacuum is maintained in said vessel to cause the juice to boil at a temperature below the point of ice formation. No external heat is applied. Within the low temperature range maintained, the esters do not volatilize, but remain in the liquid. As the freezing point is approached, the rate of evaporation diminishes and the vacuum automatically increases somewhat. Mild agitation of the liquid body is produced by means of a circulating pump 3, having its ends communicating respectively with the upper and lower parts of the liquid body. This distributes the temperature uniformly throughout the liquid, so that when the freezing point is reached, the ice crystals simultaneously begin to form throughout the mass. Since the lowering of temperature is proportionate to the rate of evaporation, which decreases as the freezing point is reached, the formation of ice crystals is slow, and therefore conducive to the exclusion from the ice of both the colloid solids and the solutes of the juice. The degree to which ice formation is permitted to extend depends upon the desired density of the concentrate. In general, when the mass in the vacuum vessel has reached the state of a wet slush, the vacuum is discontinued and the slush discharged through the valved outlet 4 into the basket 5 of a centrifuge in which the concentrate is separated from the ice. Successive batches of juice are processed in the same manner.

Due to the high vacuum under which the method is conducted, any oxygen which may have been absorbed into the natural juice is drawn out, so that the concentrate is free from the tendency to oxidative deterioration, while the temperature range throughout the method is amply low to inhibit enzymatic activity and to prevent substantial loss of vitamin content.

Figure 2:
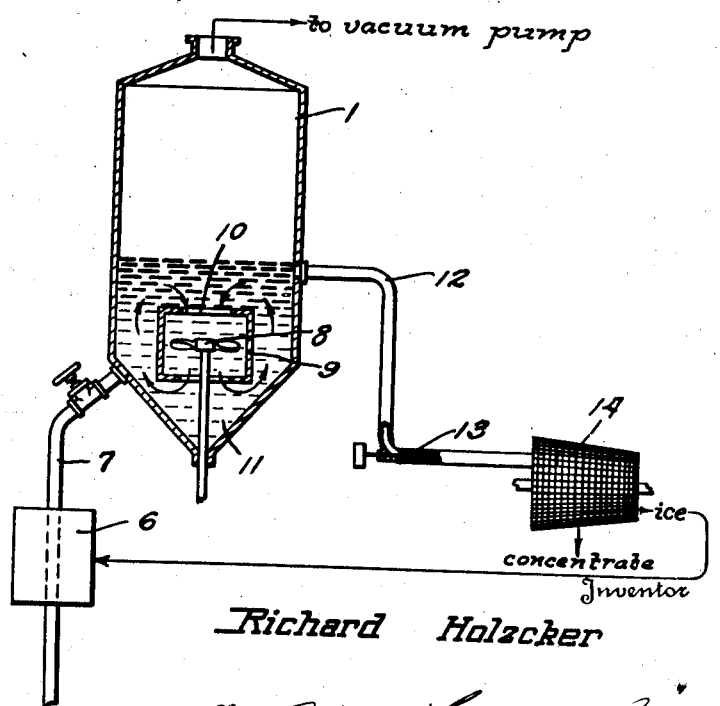
Figure 2 is a diagrammatic layout of apparatus for practicing the continuous method.

In Figure 2, which illustrates the continuous method, the natural juice is precooled before being admitted to the vacuum vessel 1, by passing through a heat exchanger 6, cooled by ice formed in a previous stage of the method. The precooled juice is continuously fed to the vacuum vessel by the pump 7, at the same rate as that at which the slush is withdrawn, so that the liquid level in the vessel remains constant.

Agitation of the liquid body is accomplished in such a manner as to conduct the ice crystals to the surface as they are formed. This may be done by means of the driven impeller 8, mounted on a vertical shaft, operating within a submerged casing 9 having a central inlet opening 10 at the top, into which the liquid is drawn, and an opening 11, at the bottom, through which the liquid is discharged outwardly in all circumferential directions, inducing an upward drift of the ice crystals throughout the annular portion of the liquid body which surrounds the casing 9.

An overflow conduit 12 communicates with the vacuum vessel just below liquid level, and gathers slush from the layer of slush floating in the liquid body, by means of the conveyor type pump 13. The conduit 12 is always full of slush, which acts as a seal to prevent air leaking into the vacuum vessel by way of said conduit. The pump 13 continuously feeds slush into a continuously driven centrifuge 14, by means of which the ice and liquid concentrate are separated.

In both embodiments of the method, it is to be understood that part of the concentration is effected by withdrawal of water through evaporation, and part by the formation and separation of the water ice crystals from the mother liquor.

*Example*

Orange juice with 12% solids was charged into a vacuum chamber which then was evacuated to 4½ millimeter pressure (mercury) during 35 minutes. Thereafter, the evacuation proceeded at a lower rate until an end pressure of slightly over 3 millimeters was reached during the next four hours. The original charge consisted of 32 pounds of juice. During the freezing, approximately three pounds of water was evaporated and approximately 19 pounds of ice formed. The resulting slush was transferred to a basket centrifugal where 10 pounds of concentrated orange juice were recovered with a solids content of 36%.

The time required for proper separation of dissolved and/or suspended solids from the solodifying water will vary with the composition of the solution, the type and size of suspended particles, the temperature of the original charge, as well as the degree of separation and final concentration desired.

While citrus fruit juice has been employed by way of example in describing the subject method of concentration, it will be understood that the invention is equally applicable to the concentration of aqueous suspensions or solutions generally.

What I claim as my invention is:

1. Continuous method for concentrating aqueous liquid suspensions and solutions comprising cooling a body of the liquid to be concentrated below the point of ice formation by the evaporation of some of its water under vacuum, continuously withdrawing slush of ice crystals and mother liquor from the zone of said body adjacent its surface level, continuously feeding make-up liquid to be concentrated to said body at the rate at which said slush is withdrawn, to keep the surface level of said liquid constant, continuously separating mother liquor from the ice crystals of the withdrawn slush, and precooling the make-up liquid.

2. Continuous method for concetrating aqueous liquid suspensions and solutions comprising cooling a body of the liquid to be concentrated below the point of ice formation by the evaporation of some of its water under vacuum, continuously withdrawing slush of ice crystals and mother liquor from the zone of said body adjacent its surface level, continuously feeding make-up liquid to be concentrated to said body at the rate at which said slush is withdrawn, to keep the surface level of said liquid constant, continuously separating mother liquor from the ice crystals of the withdrawn slush, and precooling the make-up liquid by the ice separated from the withdrawn slush.

3. Continuous method for concentrating aqueous liquid suspensions and solutions comprising cooling a body of the liquid to be concentrated below the point of ice formation by the evaporation of some of its water under vacuum, continuously withdrawing slush of ice crystals and mother liquor from the zone of said body adjacent its surface level, agitating the liquid body to promote distribution of ice crystal formation throughout its mass, continuously feeding make-up liquid to be concentrated to said body at the rate at which said slush is withdrawn to keep the surface level of said liquid constant, and continuously separating mother liquor from the ice crystals of the withdrawn slush.

4. Method for concentrating fruit juice and the like comprising cooling the juice to the point of ice formation by the evaporation of some of its water under vacuum, continuing the application of vacuum until a sufficient fraction of the partially concentrated juice has been frozen to substantially pure water ice crystals to bring the mass to a state of wet slush, and separating the remaining liquid content from the ice crystals.

5. Continuous method for concentrating fruit juices and the like comprising cooling a body of the juice to the point of ice formation by the evaporation of some of its water under vacuum, continuosly withdrawing slush of ice crystals and the juice concentrate excluded from said ice crystals from the zone of said body adjacent its surface level, continuously feeding make-up juice to be concentrated, to said body at the rate at which said slush is withdrawn, to keep the surface level of said body contsant, and continuously separating the liquid juice concentrate from the ice crystals of the withdrawn slush.

RICHARD HOLZCKER.

(References on following page)

REFERENCES CITED

The following references are of record in the file of this patent:

UNITED STATES PATENTS

| Number | Name | Date |
|---|---|---|
| 981,860 | Jackson | Jan. 17, 1911 |
| 994,555 | Alexander | June 6, 1911 |
| 1,359,911 | Oman | Nov. 23, 1920 |
| 1,865,614 | Caldwell | July 5, 1932 |
| 2,009,283 | Warner | July 25, 1935 |

FOREIGN PATENTS

| Number | Country | Date |
|---|---|---|
| 357,637 | France | Nov. 17, 1905 |

OTHER REFERENCES

Refrigeration cold storage and ice-making, 1915, by Wallis-Taylor, pages 517–518.